UNITED STATES PATENT OFFICE.

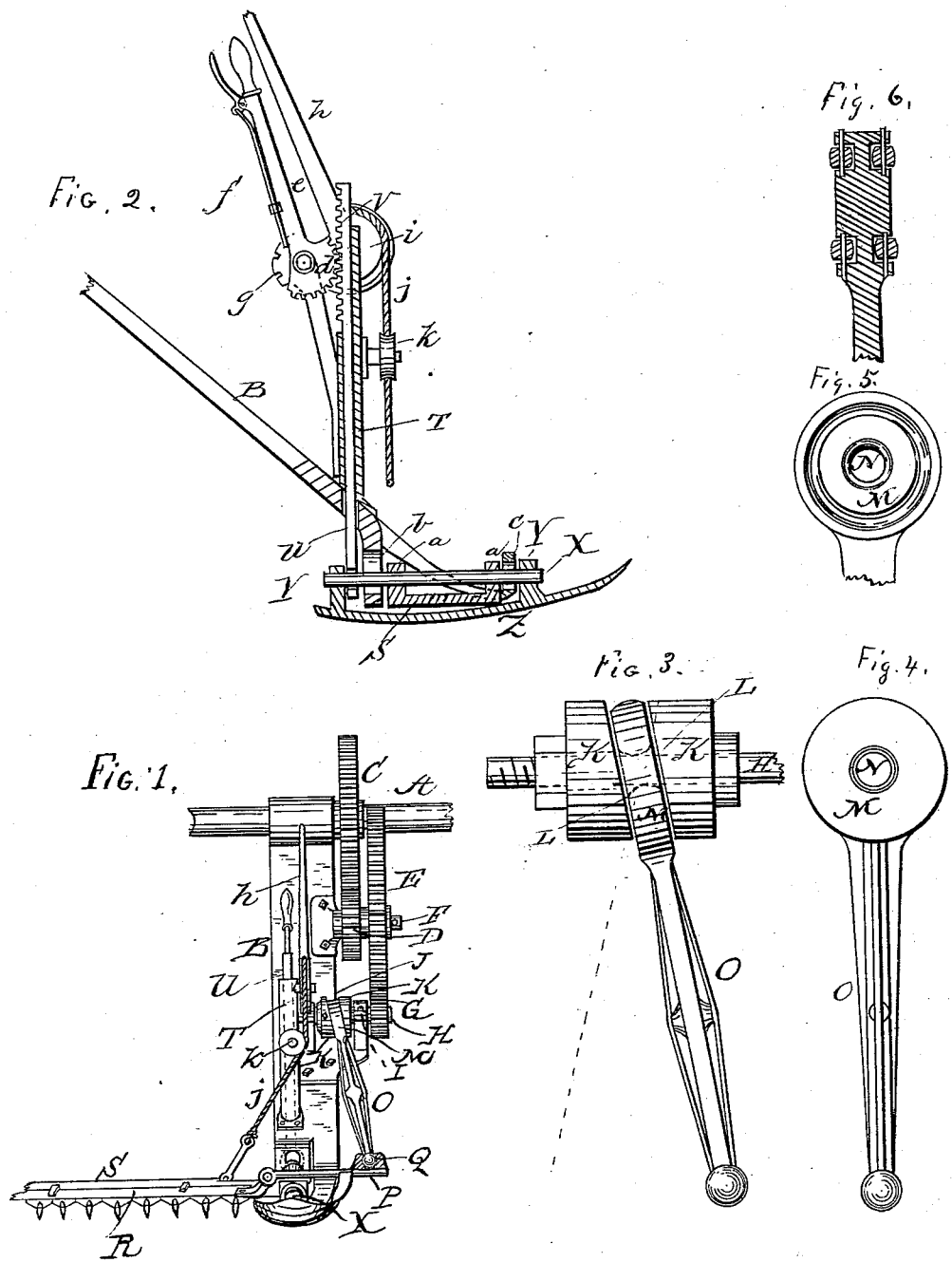

WILBER W. BALL, OF KOKOMO, INDIANA, ASSIGNOR OF ONE-HALF TO JOHN B. CARTER AND OLIVER LOUIS MOULDER, OF SAME PLACE.

MOWER.

SPECIFICATION forming part of Letters Patent No. 279,074, dated June 5, 1883.

Application filed January 2, 1883. (No model.)

*To all whom it may concern:*

Be it known that I, WILBER W. BALL, a resident of Kokomo, in the county of Howard and State of Indiana, have invented certain new and useful Improvements in Mowers; and I hereby declare that the following is a full, clear, and exact description of the same, which will enable others skilled in the art to which it appertains to make and use the same, reference being had to the accompanying drawings, which form a part of the specification, and in which—

Figure 1 is a front view of as much of a mower as embodies my improvement. Fig. 2 is a vertical section of the same, and Figs. 3, 4, 5, and 6 are detail views.

Similar letters of reference indicate corresponding parts in all the figures.

My invention has relation to mowers; and it consists in the improved construction and combination of parts of the mechanisms operating the cutter-bar and the finger-bar and shoe, as hereinafter more fully described and claimed.

In the accompanying drawings, the letter A indicates the drive-shaft of the mower, which receives its motion from the drive-wheels, and B a forward projecting inclined bar, which is fastened to the frame of the mower in any desired manner. A cog-wheel, C, is fastened upon the drive-shaft, and meshes with a pinion, D, which is fastened to a cog-wheel, E, which turns with the pinion upon a short shaft, F, projecting from the bar B. This cog-wheel meshes with a pinion, G, fastened upon a shaft, H, turning in bearings I upon bar B, and a cam, J, is secured upon the middle of the said shaft and turns with it. This cam consists of two cylinders, K, the adjacent ends L of which are cut off obliquely at the same angle, and placed upon the shaft in such a manner that the oblique ends are parallel. A disk, M, having a central perforation, N, through which the shaft H passes, and the inner edges of which are rounded to both sides, is placed upon the shaft between the oblique ends of the cylinders, and an arm, O, projects from the outer edge of the same, and is connected to a sliding bar, P, by means of a ball-and-socket joint, Q, or by any other suitable means.

The sliding bar P is hinged to the end of the sickle-bar R, which slides in the finger-bar S, and it will be seen that as shaft H and the cam are revolved the oblique inner surfaces of the same will rock disk M and arm N, which will reciprocate the sickle-bar. A tubular upright, T, is fastened upon the bar B, and a bar, U, the upper end of which forms a rack, V, slides inside the said upright, and has a perforation, W, upon its lower end, through which a bolt, X, passes, which passes through two upward projecting lugs, Y, upon the upper concave side of a spoon-shaped shoe, Z, and through two upward-projecting lugs, *a*, upon the finger-bar, while it slides in two vertical slots, *b* and *c*, in the lower end of bar B. The upper toothed end, V, of the bar is engaged by a cogged segment, *d*, upon the end of a hand-lever, *e*, which has a lock, *f*, engaging a segmental rack, *g*, upon upright T.

It will be seen that by tilting the lever, which is pivoted upon a projection from upright T, backward, it will raise bar U and lift the shoe and the finger-bar for the purpose of evading obstructions—such as stones or small stumps, &c.—or for the purpose of raising the cut of the knives, while tilting the lever forward will lower the cut.

For the purpose of raising the finger and sickle bar entirely off the ground into a vertical position when the machine is to be transported from one place to another, I pivot a lever, *h*, upon the upright T, the lower end, *i*, of which is sector-shaped and grooved in the edge, and a rope or chain, *j*, which is fastened to the lever, fitting in the groove of its sector-shaped end, passes over a pulley, *k*, upon upright T, and is fastened to the finger-bar a short distance from bolt X, upon which the latter is hinged, and raises it, when lever *h* is tilted rearward, swinging its outer end upward.

Having thus described my invention, I claim and desire to secure by Letters Patent of the United States—

1. In a mower, the combination of the inclined bar B, having slots *b* and *c* in its lower ends, and tubular upright T, shoe Z, bolt X, finger-bar S, rack-bar U V, sliding in upright T, hand-lever c, having segmental rack d and lock f, and segmental rack g, all constructed as and for the purpose shown and set forth.

2. As an improvement in mowers, the combination and arrangement, as described, of drive-shaft A, inclined bar B, cog-wheels C and E, pinions D and G, shaft H, cam J, rock-arm M O, sliding bar P, sickle-bar R, finger-bar S, shoe Z, bolt X, rack-bar U V, hand-lever d e, lever h i, and rope or chain j, all constructed to operate as and for the purpose shown and set forth.

WILBER W. BALL.

Witnesses:
 OLIVER L. MOULDER,
 AARON ALBAUGH.